Figure 1:
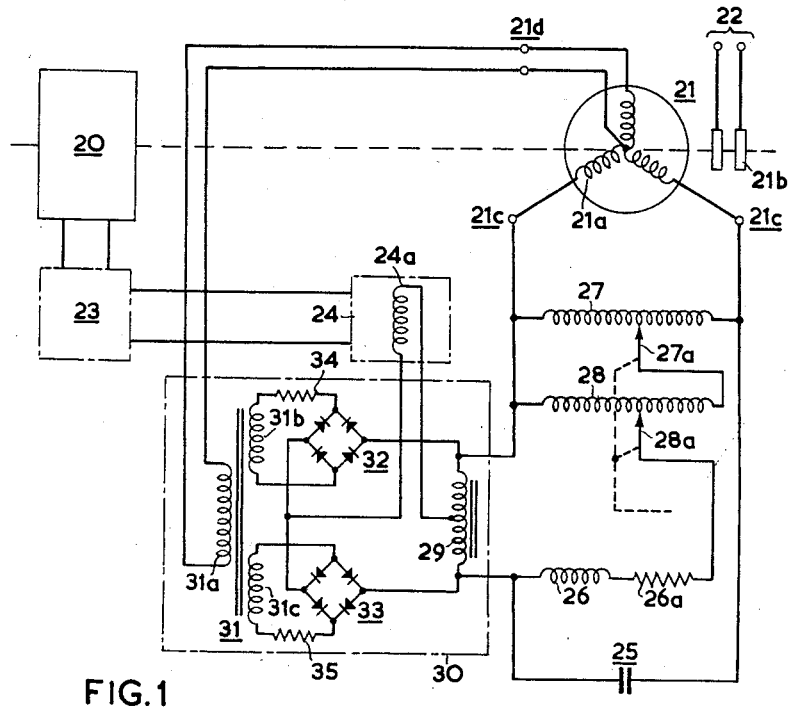

Oct. 6, 1959 H. LAW 2,907,942
FREQUENCY RESPONSIVE ELECTRIC CIRCUIT
ARRANGEMENTS AND CONTROL SYSTEMS
Filed June 3, 1957 2 Sheets-Sheet 2

Inventor:
Hilton Law
By: Stevens, Davis, Miller & Mosher
Attorneys

United States Patent Office 2,907,942
Patented Oct. 6, 1959

2,907,942

FREQUENCY RESPONSIVE ELECTRIC CIRCUIT ARRANGEMENTS AND CONTROL SYSTEMS

Hilton Law, Kidsgrove, Stoke-on-Trent, England, assignor to The English Electric Company Limited, London, England, a company of Great Britain Application June 3, 1957, Serial No. 663,239

Claims priority, application Great Britain June 14, 1956

8 Claims. (Cl. 318—328)

This invention relates to frequency responsive electric circuit arrangements and to electric control systems embodying such frequency responsive electric circuit arrangements.

An object of the invention is to provide an adjustable frequency responsive circuit arrangement employing capacitive and inductive reactive impedances in which the resonant frequency of the impedances may be readily varied without altering the magnitudes of the parameters C and L of the respective reactive impedances.

According to the present invention an adjustable frequency-responsive electric circuit arrangement comprises, in combination, a first reactive impedance, means for connecting the impedance with a variable frequency A.C. supply source, an adjustable voltage dividing means connected in parallel with the first reactive impedance and having output terminals and adjustment means for varying the voltage at the output terminals relative to the voltage applied to the voltage dividing means, a second reactive impedance connected to the said output terminals so as to be supplied with an adjustable proportion of the voltage applied to the first reactive impedance, one of the reactive impedances being a capacitive impedance and the other an inductive impedance, and phase discriminating means for producing an electric signal dependent on the deviation in phase of the resultant of the currents in the respective reactive impedances from a predetermined phase datum, adjustment of the said adjustment means being effective to vary the resonant frequency of the two reactive impedances.

Preferably the phase discriminating means is adapted to produce an electric signal dependent on the deviation in phase of the resultant of the currents in the respective impedances from a datum position corresponding to that obtained when the frequency of the A.C. supply source is equal to the resonant frequency of the two impedances.

According to another feature of the present invention the voltage dividing means may comprise, in combination, two similar voltage dividers, hereinafter referred to as the first and second voltage dividers respectively, each having input and output terminals and an adjustment member for varying the voltage at the output terminals relative to the voltage applied to the input terminals, means for connecting the input terminals of the second voltage divider to the output terminals of the first voltage divider, and coupling means for coupling together the adjustable members of the two voltage dividers for simultaneous and similar adjustment, said coupling means and adjustment members constituting the said adjustment means, and the output terminals of the second voltage divider constituting the said output terminals of the voltage dividing means.

According to another feature of the present invention an adjustable electric frequency control system comprises, in combination, a variable frequency A.C. supply source, a first reactive impedance connected across the A.C. supply source, an adjustable voltage dividing means connected in parallel with the first reactive impedance and having output terminals and adjustment means for varying the voltage at the output terminals relative to the voltage applied to the first reactive impedance, a second reactive impedance connected across the said output terminals so as to be supplied with an adjustable proportion of the voltage applied to the first reactive impedance, one of the reactive impedances being a capacitive impedance and the other an inductive impedance, and phase discriminating means for producing an electric signal dependent on the deviation in phase of the resultant of the currents in the respective impedances from a datum position corresponding to that obtained when the frequency of the A.C. supply source is equal to the resonant frequency of the two impedances, and control means for varying the frequency of the A.C. supply source in dependence upon the magnitude of the electric signal produced by the phase discriminating means, the control means being adapted to vary the frequency of the supply source in a sense tending to reduce the magnitude of the said electric signal, and adjustment of the said adjustment means being effective to vary the said resonant frequency of the reactive impedances and hence the controlled frequency of the system.

According to yet a further feature of the present invention the electric frequency control system may include means for automatically maintaining the voltage of the supply source at a pre-determined value independently of the setting of the said adjustment means.

Other features of the invention will appear from the following description with reference to the accompanying drawings where there are shown in the Figures 1, 2, 3 and 4 respectively simplified diagrams of the main circuit connections of four motor speed control systems embodying the invention.

Referring now to the Figure 1 a variable speed motor 20 whose speed is to be controlled has coupled thereto an A.C. tacho-generator 21 having a three-phase star-connected stator winding 21a. The rotor winding (not shown in the figure) of the tacho-generator is supplied from a constant voltage D.C. supply source 22 through sliprings 21b. The speed of the motor 20 is arranged to be adjusted automatically by a speed controller 23 in accordance with the magnitude and sense of a speed correcting signal supplied to it by an amplifier 24, the magnitude and sense of the speed correcting signal being determined by the magnitude and sense of the energization of a control winding 24a of the amplifier 24.

Two of the phases of the star-connected stator winding 21a are arranged to supply through line terminals 21c a parallel tuned circuit comprising a capacitor 25 of capacitance C and a choke 26 of constant inductance L and having a resistance R which is represented in the diagram by a series-connected resistor 26a. Whereas the capacitor 25 is supplied with substantially the full voltage developed by the two phases of the stator winding, the choke 26 is supplied with an adjustable proportion of that voltage, being supplied by said two phases of the stator winding through two similar variable-ratio auto-transformers 27 and 28 connected in cascade. The auto-transformer 27 is connected across the two line terminals 21c and has an adjustable output tapping 27a whereby to vary the ratio of that transformer, whilst the auto-transformer 28 is connected to the output of the auto-transformer 27 and has an adjustable output tapping 28a whereby to vary the ratio of this latter transformer 28. The two adjustable output tappings 27 and 28 are ganged for movement together whereby to vary the voltage supplied to the choke 26.

The resultant current flowing in the parallel tuned circuit when in operation, i.e. the sum of the currents passing through the capacitor 25 and the choke 26, is arranged to pass through a centre-tapped input auto-transformer 29 of a full-wave phase discriminator 30 of known type.

The discriminator 30 also comprises a transformer 31 having a primary winding 31a supplied via the terminals 21d of the alternator 21 with the A.C. voltage developed in the third phase of the stator winding 21a, and two similar secondary windings 31b and 31c connected respectively to two similar bridge-type rectifier networks 32 and 33. The rectifiers of the networks 32 and 33 are connected in a manner such that one of the secondary windings, 31b for example, passes current during the positive half cycles of the voltage applied to the primary winding 31a, whilst the other winding 31c passes current during the negative half cycles of the voltage supplied to the primary winding 31a. Two load resistors 34 and 35 connected in series with the secondary windings 31b and 31c respectively limit the currents flowing through these windings and cause them to be substantially in phase with the voltages induced in those secondary windings.

The two halves of the centre-tapped auto-transformer 29 are connected respectively across the horizontal diagonal connections of the two rectifier networks 32 and 33, and the control winding 24a of the amplifier 24 is connected in the common lead connecting the centre tapping of the auto-transformer 29 with both rectifier networks. The rectifiers of the two networks prevent current flow in the respective halves of the auto-transformer 29 except when the rectifier networks carry currents due to the secondary windings 31b and 31c of the transformer 31.

The secondary windings 31b and 31c are arranged to produce A.C. voltages which are much greater than those produced in the respective halves of the auto-transformer 29, and the load resistors 34 and 35 are arranged to be of values such that the currents flowing in the secondary windings 31b and 31c are much greater than the currents flowing in the respective halves of the auto-transformer 29.

The voltage supplied to the primary winding 31a of the transformer 31 is in quadrature phase relationship with the voltage supplied to the parallel tuned circuit, and the phase discriminator 30 functions in known manner to cause a current to flow in the control winding 24a of the amplifier 24 whenever the current in the auto-transformer 29 deviates in phase from a quadrature phase relationship with the currents flowing in the secondary windings 31b and 31c of the transformer 31, the magnitude and sense of the current flowing in the control winding 24a being dependent on the magnitude and sense of the deviation in phase of the current in the auto-transformer 29 from said quadrature phase relationship.

The control system is adjusted so that when in operation the motor speed corresponds to the setting of the two adjustable auto-transformer tappings 27a and 28a the frequency of the tacho-generator output voltage is equal to the resonant frequency of the parallel tuned circuit as determined by the settings of the two adjustable tappings 27a and 28a, the resultant current supplied to the parallel tuned circuit through the auto-transformer 29 then being substantially in phase with the voltage supplied to it, and hence in quadrature phase relationship with the voltage supplied to the primary winding 31a and the currents in the secondary windings 31b and 31c. The current in the control winding 24a is therefore of zero average value when the motor speed corresponds to the setting of the tappings 27a and 28a since during each half cycle of voltage supplied to the primary winding 31a the current flowing in the control winding, varying substantially sinusoidally, is positive for one half of the half cycle and negative for the other half of the half cycle.

If the speed of the motor deviates from the value corresponding to the setting of the tappings 27a and 28a and hence to the selected resonant frequency of the parallel tuned circuit, the phase of the resultant current in the auto-transformer 29 deviates from the quadrature phase relationship with the currents flowing in the secondary windings 31b and 31c, so that during each half cycle of the voltage supplied to the primary winding 31a the current flowing through the control winding, varying substantially sinusoidally, remains positive for a part of the half cycle of shorter or longer duration than the part of the half cycle it remains negative. The average value of current in the control winding 24a is therefore greater than zero, its sense being determined by the sense of the deviation in phase of the current in the auto-transformer 29 from the said quadrature phase relationship.

The excitation of the amplifier 24 is thus modified by the resulting energisation of the control winding 24a whereby to cause the speed regulator 23 to adjust the speed of the motor in a corrective sense and thereby reduce the current in the control winding 24a, and hence maintain the motor speed substantially at the value corresponding to the setting of the tappings 27a and 28a.

Neglecting the voltage drop in the autotransformer 29 of the discriminator 30, if the voltage developed across the capacitor 25 is V volts (R.M.S.) and the voltage developed across the inductor 26 is $x^2V$ where "$x$" is the output to input voltage ratio of each of the auto-transformers 27 and 28, it can be shown that by suitable choice of the circuit parameters R, L and C the resonant frequency of the parallel tuned circuit is given approximately by:

$$4^2(f_0)^2LC = x^2$$

Thus by varying the settings of the tappings 27a and 28a so as to vary the value of "$x^2$," the resonant frequency and hence the controlled speed of the motor may be varied. If the voltage V is maintained constant, it may also be shown that for small changes in the frequency from the resonant frequency $f_0$ the change in the current supplied to the tuned circuit through the input auto-transformer 29 is mainly one of phase, the magnitude of the current remaining substantially constant.

Since the resonant frequency $f_0$ of the parallel tuned circuit is determined by the above relationship, the use of the two similar auto-transformers each of adjustable ratio "$x$" connected in cascade and having their adjustable tappings ganged for movement together results in a linear relationship between the frequency, or motor speed, and the setting of the adjustable tappings.

It can be shown that since the output voltage of the tacho-generator 21 increases with increase in motor speed, the current flowing in the auto-transformer 29 of the phase discriminator 30, and hence in the control winding 24a, increases for a given deviation of the frequency from the resonant frequency of the parallel tuned circuit in accordance with the motor speed. This results in an overall gain of the motor speed control system which increases with increase in motor speed and vice versa, and hence in a response which is faster at high motor speeds than at low motor speeds.

However, in some motor speed control systems the increase in the speed of response with increase in motor speed may not be desirable, and hence compensation is made by reducing the gain of the amplifier 24 as the voltage of the tacho-generator 21 increases. Alternatively, a variable gain network or device may be included in the circuit to give the desired compensation.

In one modification of the motor speed control system just described the positions of the choke 26 and the capacitor 25 in the circuit are interchanged, whilst in a further modification the voltages applied respectively to the choke and the capacitor are arranged to be varied simultaneously whereby to vary the ratio "$x^2$" of the voltages applied to them and thereby to vary the resonant frequency of the tuned circuit.

In another modification of the motor speed control system just described, the variable ratio auto-transformers are replaced by potentiometer-type rheostats.

Whereas a full wave type phase discriminator has been described in the motor speed control system above, any other type of phase discriminator may be used.

In a further modification of the system described, the auto-transformer 27 is omitted and the auto-transformer 28 is connected across the tacho-generator line terminals 21c. However, with such a modified system the relationship between the setting of the adjustable tapping 28a and the controlled frequency and hence motor speed is a non-linear one.

Figure 2:
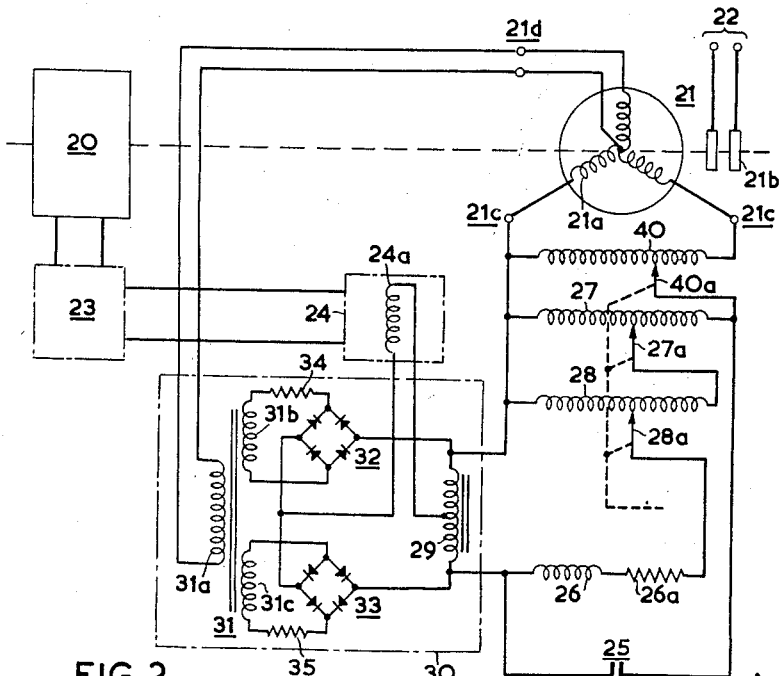
Figure 3:
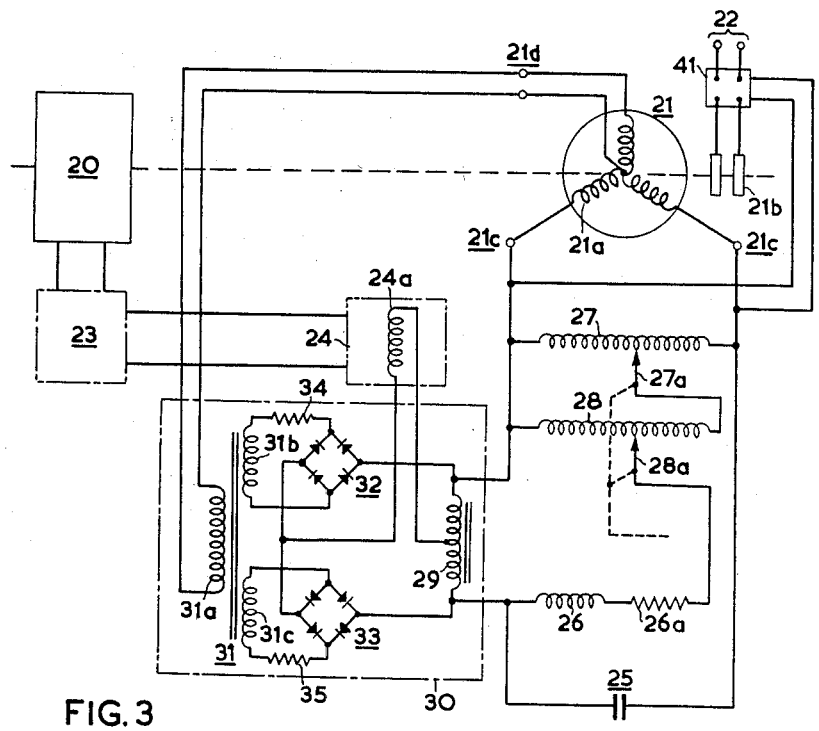
Figure 4:
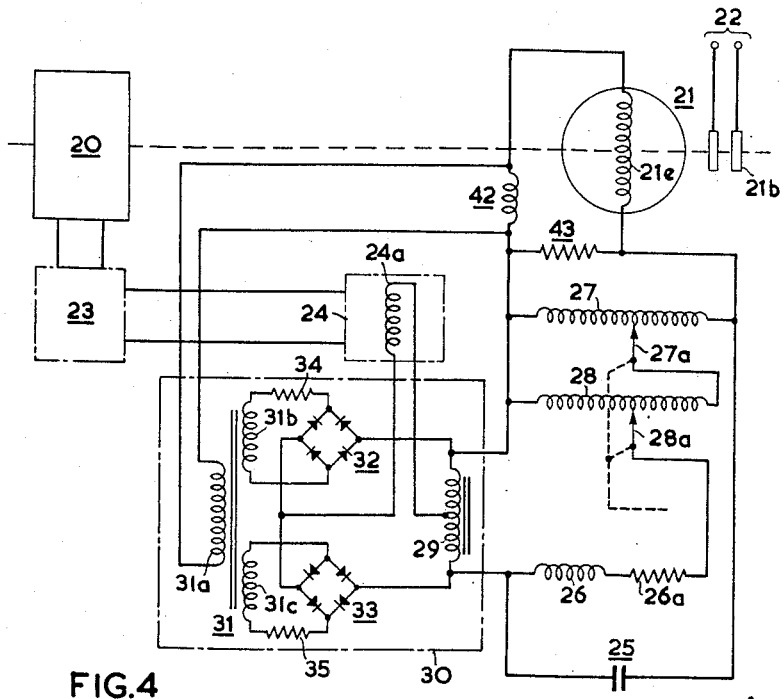

Other motor speed control systems generally similar to that shown in Fig. 1 but in which means are provided for maintaining the overall gain of the system substantially constant are shown in the Figures 2, 3 and 4.

In the control system shown in Fig. 2, the auto-transformer 27 is connected for supply across the output side of a further variable ratio auto-transformer 40 which is connected across the line terminals 21c of the tacho-generator 21. The adjustable tapping 40a of the auto-transformer 40 is ganged with the adjustable tappings 27a and 28a for adjustment together, movement of the tappings 27a and 28a in a sense tending to increase the value of $x^2$, and hence the resonant frequency $f_0$, being effective to move the tapping 40a in a sense such as to reduce the proportion of the alternator voltage applied to the auto-transformer 27. The ganging together of the adjustable tappings 40a, 27a and 28a may be arranged so that the voltage applied to the auto-transformer 27 remains substantially constant for all values of $x^2$, or alternatively so that the voltage applied to the auto-transformer 27 varies in any desired manner so as to obtain a desired variation of the overall gain of the control system with variation of $x^2$. The control system is otherwise as shown in Fig. 1.

In the control system shown in Fig. 3, an automatic voltage regulator 41 is connected between the D.C. supply source 22 and the rotor sliprings 21b, and is controlled by the output voltage of the tacho-generator 21 developed across the line terminals 21c in a manner such that the output voltage at the terminals 21a remains substantially constant for all values of $x^2$. The voltage regulator 41 may alternatively be arranged so that the voltage varies in some predetermined manner such as to give a desired predetermined variation of the overall gain of the control system with variation of $x^2$. The control system is otherwise as shown in Fig. 1.

In the control system shown in Fig. 4, the three-phase star-connected winding 21a of the tacho-generator 21 shown in the earlier figures is replaced by a single-phase stator winding 21e arranged to supply a circuit comprising an inductor 42 connected in series with a resistor 43. The impedance of the inductor 42 is arranged to be large in comparison with that of the resistor 43 over the range of frequency values within which the control system is designed to operate so that the voltage developed across the inductor is large compared with that developed across the resistor, and is in quadrature phase relationship therewith. The auto-transformer 27 is connected for supply across the resistor 43 whilst the primary winding 31a of the transformer 31 is connected for supply across the inductor 42. The control system is otherwise the same as shown in Fig. 1.

The control system operates in a manner similar to that described with reference to Fig. 1, being effective to control the motor speed controller 23 in a manner such as to maintain the current in the input choke 29 in quadrature phase relationship with the voltage supplied to the primary winding 31a, and thereby to maintain the tacho-generator frequency at the resonant frequency determined by the setting of the auto-transformer tappings 27a and 28a.

Since the impedance of the inductor is much larger than that of the resistor, and since the impedance of the inductor is proportional to the frequency, the current in the resistor 43 tends to remain substantially constant with variation of the tacho-generator frequency, and hence the voltage across the auto-transformer 27 tends to remain substantially constant with variation of frequency. The gain of the control system thus tends to be substantially constant within the range of frequencies for which the control system is designed.

What I claim as my invention and desire to secure by Letters Patent is:

1. An adjustable frequency-responsive electric circuit arrangement comprising, in combination, a first reactive impedance, means for connecting the impedance with a variable frequency A.C. supply source, an adjustable voltage dividing means connected in parallel with the first reactive impedance and having output terminals and adjustment means for varying the voltage at the output terminals relative to the voltage applied to the voltage dividing means, a second reactive impedance connected to the said output terminals so as to be supplied with an adjustable proportion of the voltage applied to the first reactive impedance, one of the reactive impedances being a capacitive impedance and the other an inductive impedance, and phase discriminating means for producing an electric signal dependent on the deviation in phase of the resultant of the currents in the respective reactive impedances from a predetermined phase datum, adjustment of the said adjustment means being effective to vary the resonant frequency of the two reactive impedances.

2. An adjustable frequency-responsive electric circuit arrangement comprising, in combination, a first reactive impedance, means for connecting the impedance with a variable frequency A.C. supply source, an adjustable voltage dividing means connected in parallel with the first reactive impedance and having output terminals and adjustment means for varying the voltage at the output terminals relative to the voltage applied to the first reactive impedance, a second reactive impedance connected to the said output terminals so as to be supplied with an adjustable proportion of the voltage applied to the first reactive impedance, one of the reactive impedances being a capacitive impedance and the other an inductive impedance, and phase discriminating means for producing an electric signal dependent on the deviation in phase of the resultant of the currents in the respective impedances from a datum position corresponding to that obtained when the frequency of the A.C. supply source is equal to the resonant frequency of the two impedances, adjustment of the said adjustment means being effective to vary the said resonant frequency.

3. An adjustable frequency-responsive electric circuit arrangement according to claim 2, wherein the phase discriminating means is connected in series relationship with both of the reactive impedances.

4. An adjustable frequency-responsive electric circuit arrangement according to claim 2, wherein the voltage dividing means comprises, in combination, two similar voltage dividers, hereinafter refered to as the first and second voltage dividers respectively, each having input and output terminals and an adjustment member for varying the voltage at the output terminals relative to the voltage applied to the input terminals, means for connecting the input terminals of the second voltage divider to the output terminals of the first voltage divider, and coupling means for coupling together the adjustable members of the two voltage dividers for simultaneous and similar adjustment, said coupling means and adjustment members constituting the said adjustment means, and the output terminals of the second voltage divider constituting the said output terminals of the voltage dividing means.

5. An adjustable frequency-responsive electric circuit arrangement comprising, in combination, an adjustable voltage dividing means having input and output terminals and adjustment means for varying the voltage at the output terminals relative to that applied to the input terminals, means for connecting the input terminals to a variable frequency A.C. supply source whose voltage varies in proportion to the frequency thereof, a first reactive impedance connected across the output terminals of the voltage dividing means, a further adjustable voltage dividing means connected in parallel with the first reactive impedance and having output terminals and adjustment means for varying the voltage at the output terminals thereof relative to the voltage applied to the first reactive impedance, a second reactive impedance connected to the output terminals of the said further voltage dividing means so as to be supplied with an adjustable proportion of the voltage applied across the first reactive impedance, one of the impedances being a capacitive impedance and the other an inductive impedance, phase discriminating means for producing an electric signal dependent on the deviation in phase of the resultant of the currents in the respective impedances from a datum position corresponding to that obtained when the frequency of the A.C. supply source is equal to the resonant frequency of the two impedances, and coupling means for coupling together the adjustment means of the two voltage dividing means for simultaneous and similar adjustment thereof, the coupling means being adapted to move the respective adjustment means in opposite senses so as to reduce the voltage applied to the first reactive impedance as the voltage applied to the second reactive impedance is increased.

6. An adjustable electric frequency control system comprising, in combination, a variable frequency A.C. supply source, a first reactive impedance connected across the A.C. supply source, an adjustable voltage dividing means connected in parallel with the first reactive impedance and having output terminals and adjustment means for varying the voltage at the output terminals relative to the voltage applied to the first reactive impedance, a second reactive impedance connected across the said output terminals so as to be supplied with an adjustable proportion of the voltage applied to the first reactive impedance, one of the reactive impedances being a capacitive impedance and the other an inductive impedance, and phase discriminating means for producing an electric signal dependent on the deviation in phase of the resultant of the currents in the respective impedances from a datum position corresponding to that obtained when the frequency of the A.C. supply source is equal to the resonant frequency of the two impedances, and control means for varying the frequency of the A.C. supply source in dependence upon the magnitude of the electric signal produced by the phase discriminating means, the control means being adapted to vary the frequency of the supply source in a sense tending to reduce the magnitude of the said electric signal, and adjustment of the said adjustment means being effective to vary the said resonant frequency of the reactive impedances and hence the controlled frequency of the system.

7. An adjustable electric frequency control system according to claim 6, including means for automatically maintaining the voltage of the supply source at a predetermined value independently of the setting of the said adjustment means.

8. An electric motor speed control system comprising, in combination, an electric motor, an A.C. tacho-generator coupled with the motor so as to be driven thereby, a first reactive impedance connected to the A.C. tacho-generator, an adjustable voltage dividing means connected in parallel with the first reactive impedance and having output terminals and adjustment means for varying the voltage at the output terminals relative to the voltage applied to the first reactive impedance, a second reactive impedance connected across the output terminals so as to be supplied with an adjustable proportion of the voltage applied to the first reactive impedance, one of the reactive impedances being a capacitive impedance and the other an inductive impedance, and phase discriminating means for producing an electric signal dependent on the deviation in phase of the resultant of the currents in the respective impedances from a datum position corresponding to that obtained when the frequency of the A.C. supply source is equal to the resonant frequency of the two impedances, and control means for varying the speed of the motor in dependence upon the magnitude of the electric signal produced by the phase discriminating means, the control means being adapted to vary the motor speed in a sense tending to reduce the magnitude of the said electric signal, and adjustment of the said adjustment means being effective to vary the said resonant frequency and hence the controlled speed of the motor.

References Cited in the file of this patent

UNITED STATES PATENTS

| | | |
|---|---|---|
| 1,811,860 | Morton | June 30, 1931 |
| 1,981,040 | Gulliksen | Nov. 20, 1934 |
| 2,157,834 | Schmidt | May 9, 1939 |